3,524,811
FLOCCULATING PROCESS
Andrew G. Tsuk, Laurel, and Thomas E. Ferington, Sandy Spring, Md., assignors to W. R. Grace & Co., New York, N.Y., a corporation of Connecticut
No Drawing. Filed Apr. 8, 1968, Ser. No. 719,694
Int. Cl. C02b 1/20
U.S. Cl. 210—52                                                                   3 Claims

ABSTRACT OF THE DISCLOSURE

A process for settling of solids suspended in water by treating the suspension with cupric or nickel ions and a water soluble acrylate polymer.

---

This invention relates to a process of coagulating and promoting the settling of solids suspended in water by adding to the suspension a small amount of a polymer having repeated groups with the formula

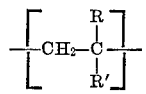

where R is hydrogen or a methyl group and R' is a carboxylic acid group (or a mixture of carboxylic acid and amide groups), or a water soluble salt thereof, and an effective amount of a water soluble cupric or nickel salt.

One of the most difficult problems in industry is the clarification of industrial waste waters. Much too often these waste waters are allowed to flow into lakes and streams causing water pollution, and in some industries, destroying the value of the stream as an aquatic habitat.

Some examples of industrial wastes are coal washing waters, paper mill white waters, phosphate mine waters, clay suspensions and other suspensions of finely divided solids resulting from industrial processes such as mining, washing and purification.

It is highly desirable to remove these finely divided solids from industrial waste waters so that these waters can be allowed to flow into streams without the risk of harmful pollution.

Another instance in which it is desirable to remove finely divided solids is treating natural sources of water in order to render them suitable for many applications. There are various industrial operations such as metal plating and papermaking which are dependent upon waters free from objectionable suspended matter.

Rivers and lakes often contain finely divided suspensions of clay and silt which are highly undesirable and usually very difficult to remove by employing inorganic coagulating agents. Such suspensions normally contain finely divided solids in concentrations of .001% to 25% by weight of the suspension. These suspensions will remain stable for days, months, and sometimes even years.

Therefore, it is the object of this invention to provide a simple, rapid and effective process for coagulating and promoting the settling of finely divided solids suspended in water.

It is also an object of this invention to provide an effective method of clarifying aqueous suspensions of finely divided solids resulting from mineral processing.

Another object of the invention is to provide a process of coagulating and settling aqueous suspensions of finely divided solids in which relatively small amounts of coagulant are required.

It has been found that solids suspended in water can be coagulated and more rapidly settled by adding to the suspension a small amount of a water soluble polymer with repeated groups having the formula

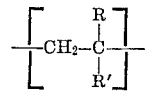

where R is hydrogen or a methyl group and R' is a carboxylic acid group (or a mixture of carboxylic acid and amide groups), or water soluble salts thereof, and a small amount of a water soluble cupric or nickel salt.

The water soluble polymers which can be used in the process of this invention include the polymers of acrylic acid, the alkali metal and ammonium salts of acrylic acid, methacrylic acid, the alkali metal and ammonium salts of methacrylic acid, acrylamide, methacrylamide, the N-alkyl subsituted amides, the N-aminoalkylamides, and the corresponding N-alkylaminoalkyl substituted amides, the aminoalkyl acrylates, the aminoalkyl methacrylamides, and any other like polymers which are complexed by copper or nickel ions.

These polymeric compositions may be homopolymers or they may be copolymers with other copolymerizing monomers, such as ethylene, propylene, isobutylene, styrene, a-methylstyrene, vinyl acetate, vinyl formate, alkyl ether, acrylonitrile, methacrylonitrile, vinyl chloride, vinylidene chloride, the alkyl acrylates, the alkyl methacrylates, the alkyl maleates, and the alkyl fumarites, and other olefinic monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the after-chemical reaction of other polymers, for example, by the hydrolysis of acrylonitrile or methacrylonitrile polymers.

Water soluble polymers which are especially useful in the process of this invention are water soluble polyacrylic acid, polymethacrylic acid, acrylic acid-methacrylic acid copolymers having a molecular weight of about 8,000 to about 300,000, and partially hydrolyzed polyacrylamide, partially hydrolyzed polymethacrylamide, and partially hydrolyzed acrylamide-methacrylamide copolymers having a molecular weight of about 30,000 to about 3,000,000.

Copper and nickel salts which are especially useful in the practice of this invention are nitrates, sulfates, selenates, and dichromates of copper and nickel in percent concentration expressed in terms of the metal ion of from 0.00001 to 0.02, and preferably from .00005 to 0.0005, that is .1 to 200 p.p.m., and preferably .5 to 5 p.p.m.

When it is desired to practice the process of this invention by adding the two treating agents together in the same solution, it is necessary to maintain the pH of this combined additive solution below about 3 so that no precipitate forms.

If, however, the suspension contains at least about 0.1 p.p.m. of a water soluble acrylate polymer then only an effective amount of copper or nickel ions need be added to the suspension for coagulating and settling of solids to occur. On the other hand, if the suspension contains at least about 0.1 p.p.m. of copper or nickel ions, then only an effective amount of a water soluble acrylate polymer need be added to the suspension for coagulation to occur.

In some cases it is possible to recover the water soluble polymer and copper from the settled solids for reuse. This is of economic importance since recycling of the cupric polyacrylate or nickel polyacrylate coagulating composition decreases the cost of chemicals used in water treatment.

Also, in water containing high calcium hardness, the levels of added copper and acrylate polymer can be reduced partially without losing coagulating effectiveness.

For example, in an aqueous suspension containing 300 p.p.m. kaolin clay and 20 p.p.m. CaCO₃, 16 p.p.m. acrylate polymer and 10 p.p.m. copper are needed to produce coagulating and settling of the clay. However, in a similar suspension containing 300 p.p.m. kaolin clay but 150 p.p.m. CaCO$_3$, only 10 p.p.m. acrylate polymer and 6 p.p.m. copper are required for flocculation.

The combination of the cupric-polyacrylate coagulating additives of this invention with known water soluble polymeric coagulants can yield beneficial results greater than obtained with either alone.

When, for example, polyacrylamide is added to an aqueous suspension of solids along with the cupric-polyacrylate composition, the rapid settling behavior due to the polyacrylamide was obtained along with the permanence of coagulating effect due to the cupric polyacrylate composition. By using this combination it is also possible to use a lower concentration of treatment than in either case alone.

This invention is further illustrated by the following specific but nonlimiting examples.

EXAMPLE I

A suspension of 300 p.p.m. of kaolin clay in tap water was treated with 2 p.p.m. of polyacrylic acid and 4 p.p.m. copper (as Cu$^{++}$ ion). The necessary amounts of polyacrylic acid (average molecular weight about 90,000) solution and a cupric nitrate solution and water were mixed to give a solution at a pH below 3 and a polymer content of about 0.3% by weight or less. This coagulant solution was added dropwise to the vigorously stirred suspension. The treated suspension settled to a dense sediment layer—plus a clear supernatant liquid in 30 minutes. An untreated control comparison took overnight to settle and left a cloudier supernate.

EXAMPLE II

A suspension of about 25% copper sulfide ore was treated with 2 p.p.m. of sodium polymethacrylate and 2 p.p.m. copper (as Cu$^{++}$ ion). The necessary amounts of sodium polymethacrylate (average molecular weight of 10,000), cupric nitrate solution and water were mixed to give a solution at a pH below 3, and a polymer content of about .3% by weight or less. This coagulant solution was added dropwise to the vigorously stirred suspension. The treated suspension settled to a dense sediment layer—plus a clear supernatant liquid in about 20 minutes while an untreated control sample took 4 hours.

EXAMPLE III

Recycling of treatment

A suspension of 300 p.p.m. of kaolin clay in hard tap water was treated with 16.6 p.p.m. polyacrylate and 6.7 p.p.m. copper at pH 3.9. Rapid coagulation occurred. After coagulation the settled clay sludge was separated from the clear supernate. The clay sludge, whose volume was about 1/30 of that of the original suspension was treated with HCl to bring the pH to below 2.5. It was allowed to settle. The clay settled well. The acid supernate was drawn off and used as the coagulant to treat a new batch of suspended clay. This process was repeated three more times without appreciable diminution of the coagulating effectiveness.

EXAMPLE IV

A suspension of 450 p.p.m. of kaolin clay in tap water was treated with 3 p.p.m. polymethacrylate acid and 6 p.p.m. nickel (as Ni$^{++}$ ion). The necessary amounts of polymethacrylic acid (average molecular weight about 125,000) solution and a nickel nitrate solution and water were mixed to give a solution at a pH of 2.7 and a polymer content of about .25% by weight. This coagulant solution was added dropwise to the vigorously stirred suspension. The treated suspension settled to be a dense sediment layer plus a clear supernatant liquid in 25 minutes.

An untreated control comparison took over twelve hours to partially settle.

EXAMPLE V

Synergistic effects

Suspension A and Suspension B each containing 25% copper sulfide ore were treated with 5 p.p.m. polyacrylamide.

Suspension A was allowed to settle. Initially, the polyacrylamide gave good coagulating behavior, but after several hours no coagulating effect could be seen at all. Suspension B was treated with 3 p.p.m. sodium polymethacrylate (average weight 10,000) and 2 p.p.m. copper (as Cu$^{++}$ ion), according to the procedure of Example I. Immediately the rapid settling behavior of the polyacrylamide was obtained along with the permanence of coagulating effect found with copper plus acrylate polymers. By using the combination it was also possible to use a lower concentration of treatment than in either case alone.

What is claimed is:

1. A process for promoting settling of copper sulfide ore from aqueous suspensions thereof which comprises adding to the said suspension containing finely-divided copper sulfide ore about 5 p.p.m. polyacrylamide, about 3 p.p.m. sodium polymethacrylate polymer having an average molecular weight of at least 10,000, and about 2 p.p.m. copper ion, and allowing the finely divided solids to settle.

2. A process for promoting settling of solids suspended in water, which comprises adding to the suspension an aqueous solution, having a pH below about 3, of
    (a) a polymer selected from the group consisting of polyacrylic acid, polymethacrylic acid, acrylic acid-methacrylic acid copolymers, partially hydrolyzed polyacrylamide, partially hydrolyzed polymethacrylamide, partially hydrolyzed acrylamide-methacrylamide copolymers, and the water-soluble salts of the polymers and copolymers above mentioned, in an amount which is insufficient by itself to cause coagulation of the solids, and
    (b) an effective amount of a water soluble cupric or nickel salt.

3. Process of claim 2 wherein polyacrylamide is added to said suspension as well as the said added solution of acrylate polymer and water-soluble cupric or nickel salt.

References Cited

UNITED STATES PATENTS

| | | | |
|---|---|---|---|
| 2,729,557 | 1/1956 | Booth et al. | 210—54 X |
| 2,740,522 | 4/1956 | Aimone et al. | 210—54 X |
| 2,980,610 | 4/1961 | Ruehrwein | 210—58 |
| 3,019,195 | 1/1962 | Denman et al. | 210—52 X |
| 3,110,666 | 11/1963 | Hedley et al. | 210—58 |
| 3,331,773 | 7/1967 | Gunderson et al. | 210—58 |
| 3,118,832 | 1/1964 | Katzer et al. | 210—54 |
| 3,252,899 | 5/1966 | Rice et al. | 210—54 X |

OTHER REFERENCES

Betz Handbook of Industrial Water Conditioning, Betz Laboratories, Inc., 1958, Phila., Pa., 5th ed., pp. 90–94 relied on.

Mueller, K. C., et al.: Effects of Polyelectrolyte Coagulant Aids on Removal of Missouri River Turbidity with Ferric Sulfate, Jour. AWWA, vol. 56, March 1964, pp. 333–346.

MICHAEL E. ROGERS, Primary Examiner

U.S. Cl. X.R.

252—181